(12) United States Patent
Gidney

(10) Patent No.: US 9,996,528 B2
(45) Date of Patent: Jun. 12, 2018

(54) ADVANCED CLAUSE GROUPINGS DETECTION

(71) Applicant: Seal Software Ltd., Godalming, Surrey (GB)

(72) Inventor: Kevin Gidney, Oslo (NO)

(73) Assignee: Seal Software Ltd., Godalming, Surrey (GB)

( * ) Notice: Subject to any disclaimer, the term of this patent is extended or adjusted under 35 U.S.C. 154(b) by 966 days.

(21) Appl. No.: 14/340,101

(22) Filed: Jul. 24, 2014

(65) Prior Publication Data
US 2016/0026620 A1    Jan. 28, 2016

(51) Int. Cl.
G06F 17/00    (2006.01)
G06F 17/27    (2006.01)
G06Q 50/18    (2012.01)

(52) U.S. Cl.
CPC ......... *G06F 17/2785* (2013.01); *G06Q 50/18* (2013.01)

(58) Field of Classification Search
CPC .................................................. G06F 17/2785
See application file for complete search history.

(56) References Cited

U.S. PATENT DOCUMENTS

| | | | | |
|---|---|---|---|---|
| 6,654,731 B1 * | 11/2003 | Mahesh | ............. | G06F 17/2795 706/45 |
| 7,171,415 B2 * | 1/2007 | Kan | ................. | G06F 17/30867 |
| 8,781,815 B1 * | 7/2014 | Gidney | ............... | G06F 17/2785 704/1 |
| 2003/0135520 A1 * | 7/2003 | Mitchell | ........... | G06F 17/30309 |
| 2006/0069545 A1 * | 3/2006 | Wu | ....................... | G06F 17/2705 704/8 |
| 2007/0255754 A1 * | 11/2007 | Gheel | ............... | G06F 17/30867 |
| 2008/0168135 A1 * | 7/2008 | Redlich | .................. | G06Q 10/10 709/204 |
| 2008/0178076 A1 * | 7/2008 | Kritt | ...................... | G06F 17/273 715/257 |
| 2008/0189249 A1 * | 8/2008 | Petakov | .............. | G06F 17/3087 |
| 2009/0157385 A1 * | 6/2009 | Tian | ........................ | G06F 17/28 704/9 |
| 2009/0249431 A1 * | 10/2009 | McCollum | .............. | G06F 21/10 726/1 |
| 2013/0311872 A1 * | 11/2013 | Jokl, III | .............. | G06F 17/3089 715/234 |
| 2015/0106378 A1 * | 4/2015 | Clark | ................ | G06F 17/30707 707/740 |
| 2015/0106385 A1 * | 4/2015 | Clark | ...................... | H04L 41/22 707/748 |
| 2017/0061352 A1 * | 3/2017 | Kogut-O'Connell | .. | G06Q 50/18 |

* cited by examiner

*Primary Examiner* — Mustafa A Amin
(74) *Attorney, Agent, or Firm* — Fenwick & West LLP

(57) ABSTRACT

An electronic documents verification system (and method) detects related contracts, and analyzes contents in the related contracts including a primary contract and associated amendments from raw input data. One embodiment of a disclosed configuration includes a system (and method) for identifying clauses used in the related contracts. The system (and method) extracts features including key references or descriptions within each contract. Additionally, the system (and method) groups the related contracts, and establishes linkages of the related contracts based on the extracted features. Furthermore, the system (and method) analyzes contents in the related contracts based on advanced policy group including a plurality of policy groups.

20 Claims, 10 Drawing Sheets

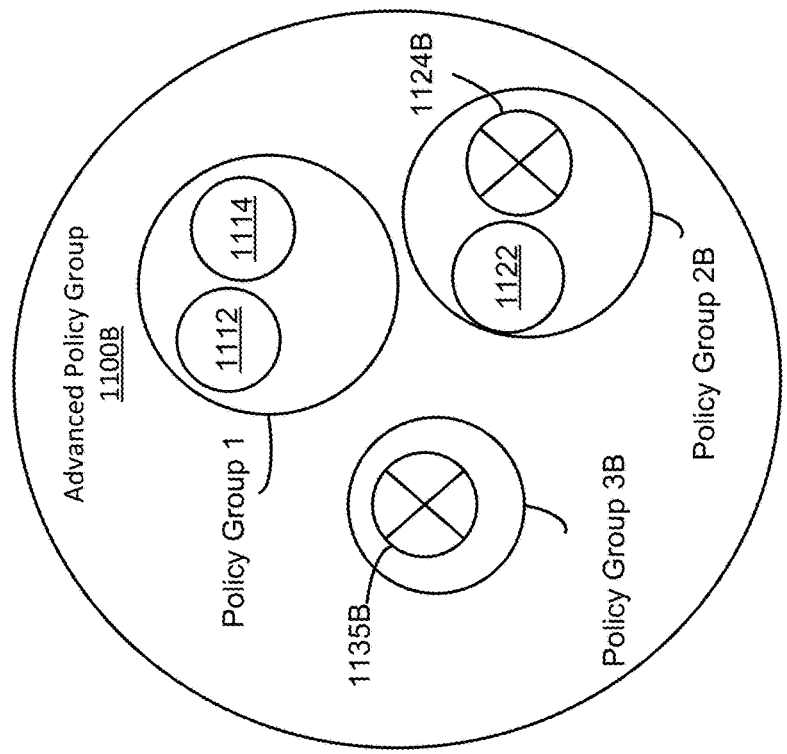
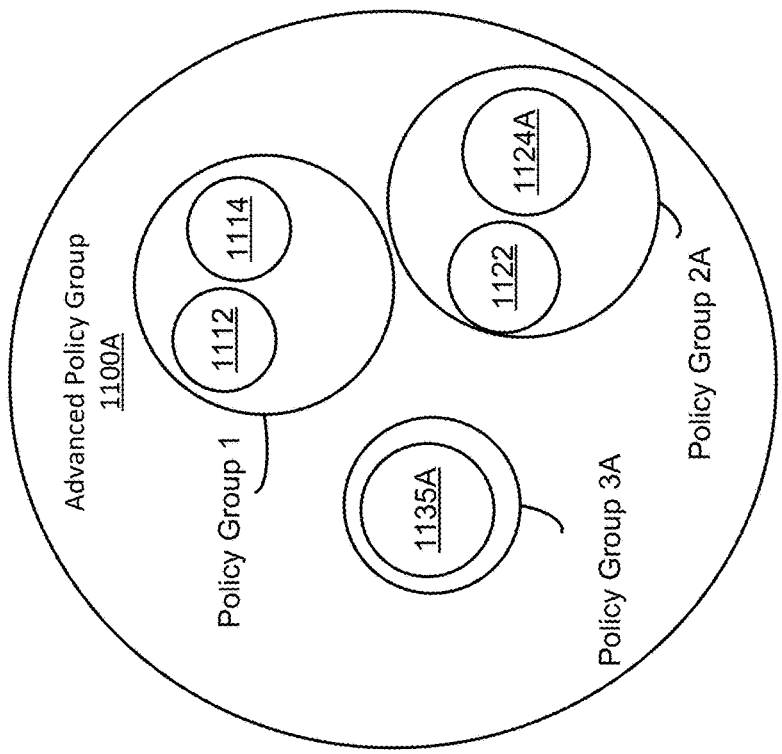

ADVANCED CLAUSE GROUPINGS DETECTION

BACKGROUND

1. Field of Art

The disclosure generally relates to the field of data management, and in particular, to identifying and extracting information from documents.

2. Description of the Related Art

A contract is a document that defines legally enforceable agreements between one and more parties. During the negotiation process, parties to the contract often agree to make multiple amendments or addendums, and these amendments or addendums can be stored in random formats in differing locations. In most cases, the amendments contain only the details that are to be changed with very little information from a primary contract.

Without the structured filing and tracking system of related contracts including the primary contract and the associated amendments, contracts may easily become separated. This separation means that future references to the contract could be referring to old or inconsistent data, exposing any parties not keeping track of the amendments or the addendums to a significant amount of risk of overlooking the amendments and critical information contained within them. For example, a primary contract may include a clause such as "net 30 days," and an amendment may contain "15 days with 60% penalty." As the number of amendments and addendums grow, identifying critical clauses and variations of the clauses in the primary contract and amendments becomes difficult.

Conventional approaches manually keep track of a primary contract and amendments. However, manually keeping track of the primary contract and amendments can be a time consuming process. Furthermore, identifying critical clauses and variations of them used in multiple documents can be unreliable due to human errors.

Accordingly, there is a lacking an automated system that identifies related contracts from a plurality of documents, and detects critical clauses in the related contracts.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

FIGS. 11A and 11B illustrate example applications of the advanced policy group detection according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A document processing system (and method and computer readable storage medium storing instructions) includes an electronic documents verification system that detects related contracts and analyzes contents in the related contracts. The related contracts include a primary contract and associated amendments from raw input data.

One embodiment of a disclosed configuration includes a system for identifying clauses used in the related contracts. The system extracts features including key references or descriptions within each contract. A feature herein refers to a key reference or a descriptive verb that can describe a document and the information held within. For example, a feature of a contract can be a start date, a termination date, a contract type, and etc. Additionally, the system groups the related contracts, and establishes linkages of the related contracts based on the extracted features.

Furthermore, the system analyzes contents in the related contracts based on an advanced policy group. The advanced policy group is a collection of policy groups, where each of the plurality of policy groups includes a plurality of policies. A policy herein refers to input parameters to be used on clause analysis. For example, the policy may include, but are not limited to, rules, features, clause examples and a threshold value to be used in clause analysis. For example, an advanced policy group may contain a policy group related to a change of control, and the policy group may further include policies or clause examples such as '10% of ownership has changed,' or 'within 3 years.' Based on the advanced policy group, the system identifies clauses and variations of them used in the related contracts.

Related Contracts Analysis System

Figure 1:
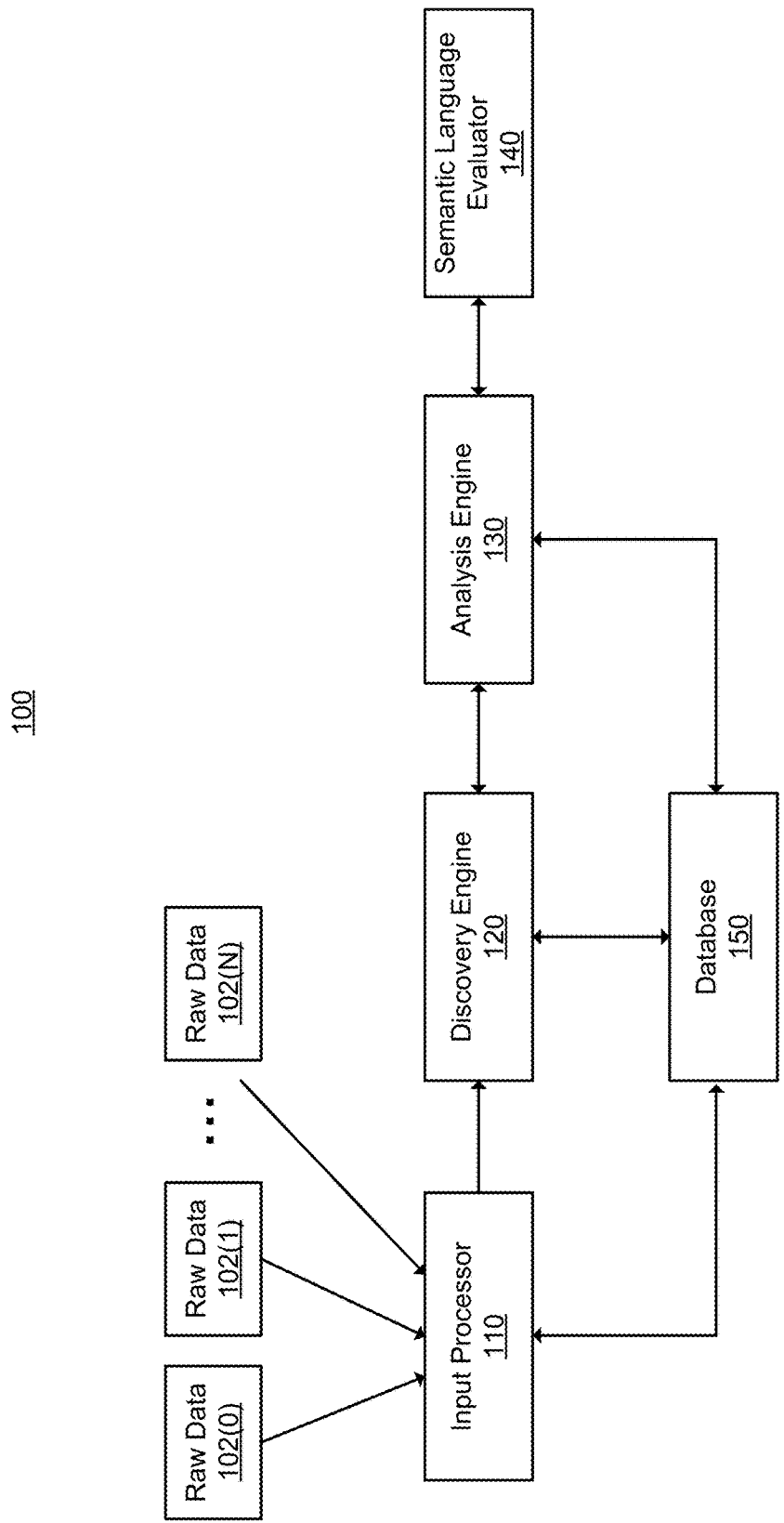
FIG. 1 illustrates one embodiment of system architecture for advanced policy group detection according to one embodiment.

FIG. 1 illustrates one exemplary embodiment of a related contracts analysis system 100 including one or more input processors (generally an input processor 110), a discovery engine 120, an analysis engine 130, a semantic language evaluator 140, and a database 150. The engines or modules include software (or firmware) structured to operate with processing components of a computing system to form a machine that operates as described herein for the corresponding engines or modules. Further, two or more engines may interoperate to form a machine that operates as described herein. Examples of the processing components of the computing system are described with respect to FIG. 12. As illustrated in FIG. 1, the input processor 110 aggregates one or more raw data 102(0), 102(1) . . . 102(N) (generally 102), and processes them in an appropriate format. Also, the discovery engine 120 is communicatively coupled to the input processor 110. In addition, the analysis engine 130 is coupled to the discovery engine 120. The discovery engine 120 develops a predefined policy and initial search results. The predefined features can be a pre-generated key reference or a descriptive verb that can describe the document and the information held within. The analysis engine 130 performs core functions of detecting and linking the related contracts. In addition, the analysis engine 130 performs semantic language analysis with the semantic language evaluator 140 to verify an advanced policy group in the related contracts. Throughout the process the database 150 stores the initial search results, metadata, and the predefined features. The database 150 is communicatively coupled to the input processor 110, the discovery engine 120, and the analysis engine 130.

Figure 2:
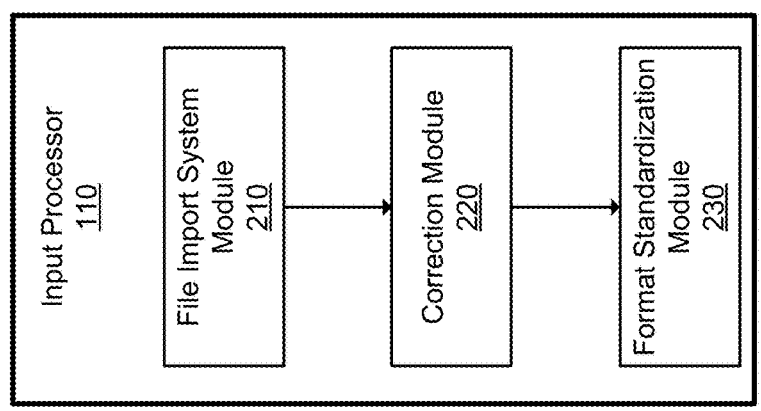
FIG. 2 illustrates a system for an input processor configured to process input data, according to one embodiment.

Turning to FIG. 2, it illustrates an exemplary embodiment of an input processor 110 that may aggregate the raw data 102, and refine them into acceptable formats in the following stages. As shown in FIG. 2, the input processor 110 includes a file import system module 210, a correction module 220, and a format standardization module 230.

The file import system module 210 receives the raw data 102 from any one of file systems, emails, Content Management Systems (CMS), and physical document scanning devices. The file import system module 210 also detects potential contracts and checks if any duplicates of documents exist in the database 150 already. In addition, the file import system module 210 can convert a physical document into another electronic format, for example Portable Document Format (PDF), MICROSOFT Office format, Tagged Image File Format (TIFF), Graphics Interchange Format (GIF), Joint Photographic Experts Group (JPEG), and etc. Moreover, the file import system module 210 may include an image file processor module with an optical character recognition (OCR) engine (not shown). The OCR engine may be an ABBYY fine reader engine or a standard iFilter OCR engine. It is to be noted that other types of OCR engines or any combinations of OCR engines may be implemented. Furthermore, the file import system module 210 detects the language of the contractual document and how many words exist within.

The correction module 220 in the input processor 110 receives the data imported from the file import system module 210. The correction module 220 also is configured to apply typographical corrections or OCR corrections.

In an exemplary embodiment, the format standardization module 230 tailors the format of the data imported from the file import system module 210 for further processing. The format standardization module 230 applies filters to extract textual information. In addition, the input processor 110 may remove passwords to access a protected contractual document only when the owners of the documents agree to remove such passwords. Furthermore, the format standardization module 230 includes a file protection function that creates copies of potential contracts identified. These identified contracts are stored in the database 150 with security access attributes.

Figure 3:
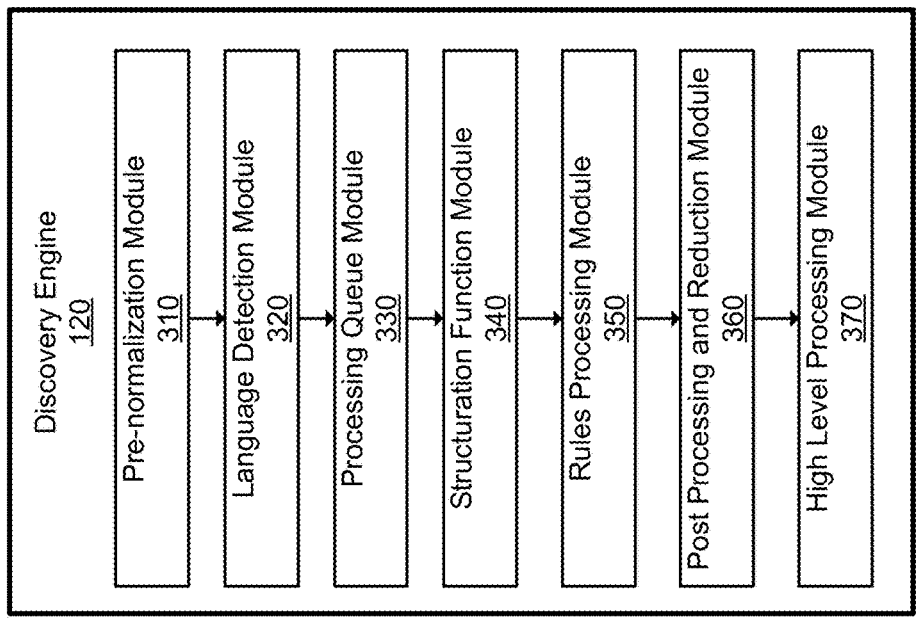
FIG. 3 illustrates a system for a discovery engine to properly structure and to normalize the input data, according to one embodiment.

Next, FIG. 3 illustrates an embodiment of the discovery engine 120 that structurally analyzes input data from the input processor 110 and generates the predefined features. The predefined features include, but are not limited to, a contract type, a contract class, and reference dates.

The discovery engine 120 also applies the predefined features into the search engine (not shown) and prepares the initial search results along with the predefined features and metadata in a format that allows a user to view. As shown in FIG. 3, the discovery engine 120 includes a pre-normalization module 310, a language detection module 320, a processing queue module 330, a structuration function module 340, a rules processing module 350, a post processing and reduction module 360, and a high level processing module 370.

The pre-normalization module 310 receives the imported data in the standardized format obtained from the input processor 110, and converts the imported data into the standard XML or HyperText Markup Language (HTML) document. Also, the language detection module 320 can identify the language used in the XML or HTML converted document (e.g., English, German, and etc.), and place the document in the processing queue module 330.

Once the XML or HTML converted document is out of the processing queue module 330, the structuration function module 340 structurally analyzes the XML or HTML converted document into a plurality of hierarchical levels, including a sentence level, a paragraph level, a section level, and a document level. Analyzing the documents or data in the structure mentioned above allows locating of terminologies and clauses used in the contracts.

Following the structuration function module 340 is the rules processing module 350. The structuration function module 340 applies predefined rules to generate the predefined features. The predefined rules determine the logic or sequence of words, sentences, phrases, NLP (natural language processing) features, or terminologies. In addition, the rules processing module 350 generates the predefined features from the predefined rules for the user to customize in the analysis engine 130.

In addition, the post processing and reduction module 360 reduces and normalizes the predefined features from the rules processing module 350. It is to be noted that in addition to sentence and paragraph boundaries, the discovery engine 120 can identify contractual section boundaries such as termination, limitation of liability, indemnity sections of a contract, and etc. Moreover, the post processing and reduction module 360 prepares the predefined features for the user to customize in the analysis engine 130.

Normalization in the post processing and reduction module 360 reduces common notations into a standard format. For instance, the same date can be expressed in multiple ways (e.g. October 23, 1992, Oct. 23rd 1992, 10/23/1992, 23/10/1992, 1992/10/23, 19921023, 10231992, etc.), and the normalization can convert various formats into standard ISO format. Normalizing to the standard format can eliminate (or substantially reduce) confusion and improve processing speed. Most importantly, by consolidating into same notations, the post processing and reduction module 360 can reduce any duplicate terms in different formats.

After the feature creation and normalization, the high level processing module 370 creates metadata and stores them in the database 150. Additionally, the search engine (not shown) communicatively coupled to the database 150 obtains initial search results. Moreover, the high level processing module 370 prepares the predefined features as well as the initial search results in a format that the user can view. Furthermore, either one or both of an internal search engine (not shown) and an external search engine (not shown) coupled to the discovery engine 120 may perform a search function.

Figure 4:
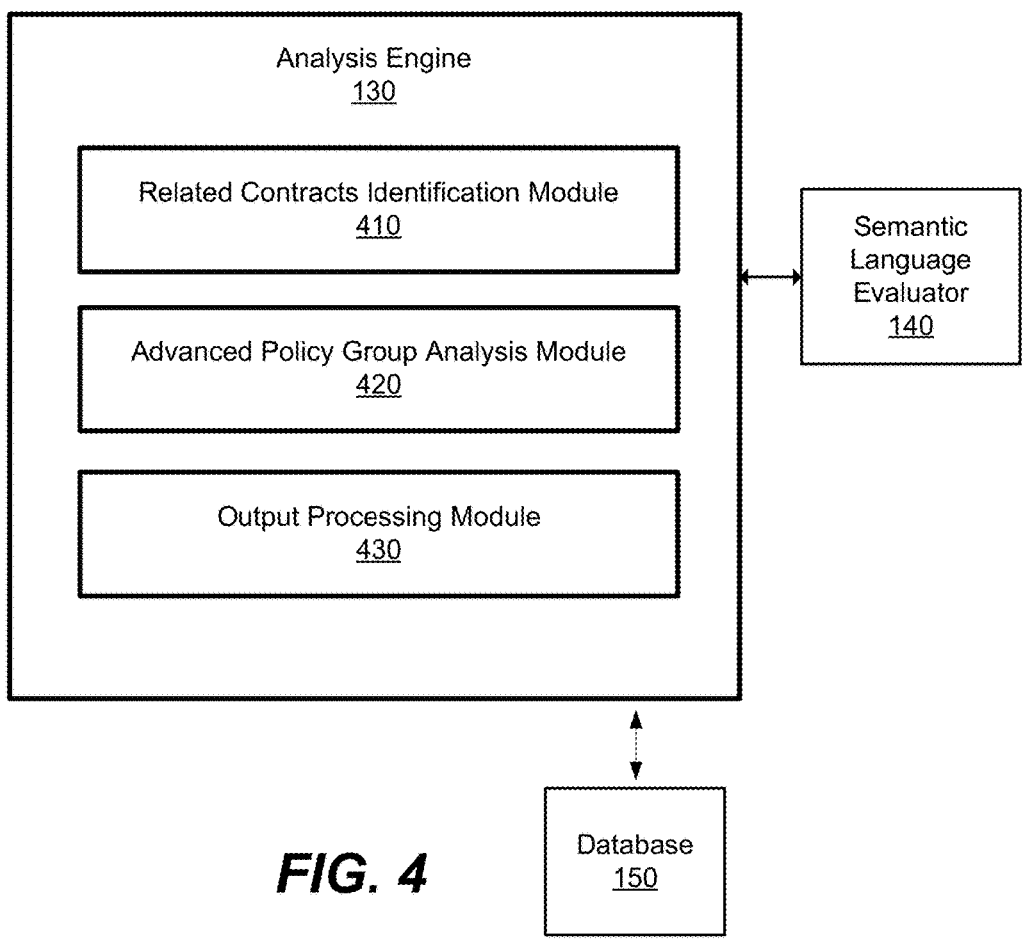
FIG. 4 illustrates an embodiment of an analysis engine to identify the related contracts and to sequentially link the related contracts in order.

Referring now to FIG. 4, illustrated is one embodiment of the analysis engine 130, which performs the core function in identifying related contracts and analyzing the advanced policy group in the related contracts. As illustrated, the analysis engine 130 includes a related contracts identification module 410, an advanced policy group analysis module 420, and an output processing module 430. The related contracts identification module 410 groups the related contracts, and establishes linkages of the related contracts based on features extracted. In addition, the advanced policy group analysis module 420 defines policies and performs an analysis on the related contracts based on the policies. The output processing module 430 generates outputs based on the analysis on the related contracts for display to a user.

Figure 5:
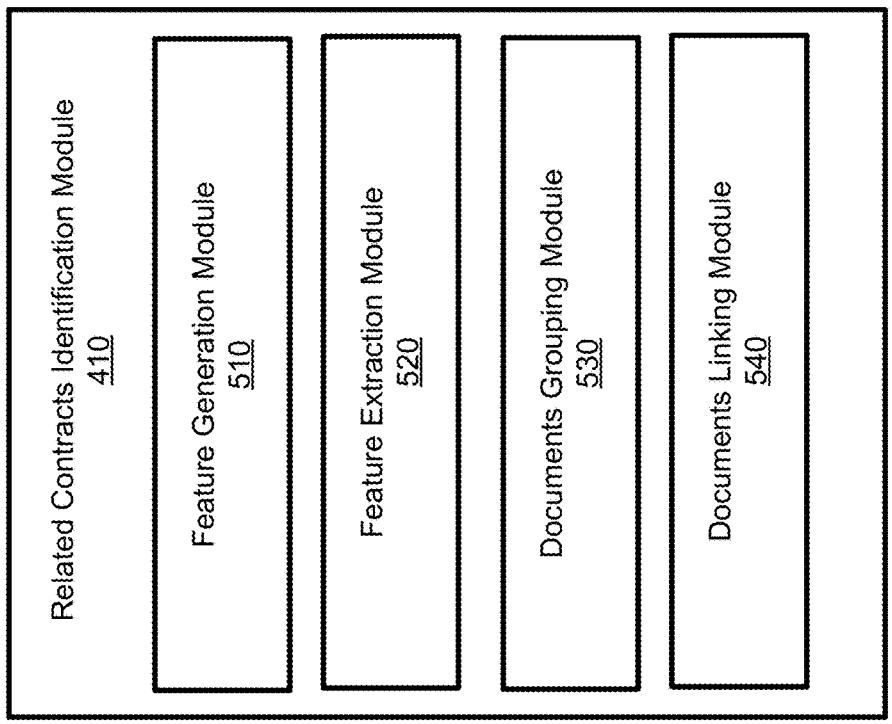
FIG. 5 illustrates an embodiment of a related contracts identification module to identify the related contracts and to sequentially link the related contracts in order.

Turning to FIG. 5, an exemplary embodiment of the related contracts identification module 410 includes a feature generation module 510, a feature extraction module 520, a documents grouping module 530, and a documents linking module 540.

The feature generation module 510 may use the predefined features as primary features without the user defining the primary features. The primary features can be a key reference or a descriptive verb to be applied in the feature extraction module 520 that can describe the document and the information held within. Alternatively, the feature generation module 510 may allow the user to define the primary features based on the predefined features. The primary features include, but are not limited to, a contract type, a contract class, reference dates, and a modification time (MTIME). The modification time refers to the time when the contractual document is created, as contracts are image files or non-changeable PDF's. It is to be noted that the modification time is distinct from a change time (CTIME). For example, whenever changing a file permission or moving a file to another file system, the change time is updated whereas the modification time remains the same. The reference dates further include an effective date, a signature date, and a termination date.

The feature extraction module 520 extracts the primary features from the contracts and stores the extracted primary features in the database 150. In one embodiment, the feature extraction module 520 may utilize at least a natural language processing (NLP), machine learning, and rule sets, to extract features. In one exemplary embodiment, the feature extraction module 520 obtains a contract type and a contract class first, which both indicate whether a document is the primary contract or the amendment. Further, the feature extraction module 520 obtains additional primary features including a reference date and start time from each of the contracts.

After the feature extraction module 520 obtains the primary features, the documents grouping module 530 identifies the related contracts from a plurality of documents. The documents grouping module 530 builds a feature space matrix with the extracted primary features, and then groups the contracts into a primary group and a secondary group by the contract type and the contract class. The primary group includes a primary contract, whereas the secondary group includes amendments. In one embodiment, the documents grouping module 530 builds a feature space matrix with pointers to the corresponding primary features in the database 150, and then identifies the related contracts with the pointers to reduce the extra storage requirement. Alternatively, the primary features themselves or the copies may be compared and transferred in the database 150 to identify the related contracts. In case only one document is in the raw data, the feature extraction module 520 may not be utilized.

The documents grouping module 530 divides the amendments in the secondary group into a related group and a non-related group by comparing the reference dates. In addition, the documents grouping module 530 compares each of the reference dates of the amendments in the related group with each of the reference dates of the primary contract, and classifies the amendments into the related group if there is at least one matching reference date. Thus, the documents grouping module 530 classifies the amendments with direct references to the primary contract. Furthermore, if there are no matching reference dates in an amendment, then the documents grouping module 530 classifies the amendment into the non-related group.

Moreover, the documents grouping module 530 finds additional related contracts and includes the related contracts into the related group by comparing the reference dates. Specifically, the documents grouping module 530 compares each of the reference dates of the amendments in the non-related group with each of the reference dates of the amendments in the related group. If there is at least one matching reference date, the documents grouping module 530 incorporates the amendments in the non-related group with a matching reference date into the related group. Hence, the documents grouping module 530 incorporates the amendments with indirect references to the primary contract into the related group. In case an amendment from the non-related group is incorporated into the related group, the documents grouping module 530 compares remaining amendments in the non-related group, because the recently incorporated amendment may include the reference dates that have not been compared before.

Furthermore, the documents grouping module 530 identifies any incorrect grouping by comparing the modification time. Specifically, the documents grouping module 530 excludes the amendment with the modification time prior to the start date of the primary contract from the related group and incorporates it into the non-related group.

Moreover, once the related contracts are identified from the documents grouping module 530, the documents linking module 540 sorts the primary contract with the amendments in the related group according to the modification time. In addition, the documents linking module 540 further sequentially establishes linkages (e.g. associations) from one contractual document to the next document in order.

Figure 6:
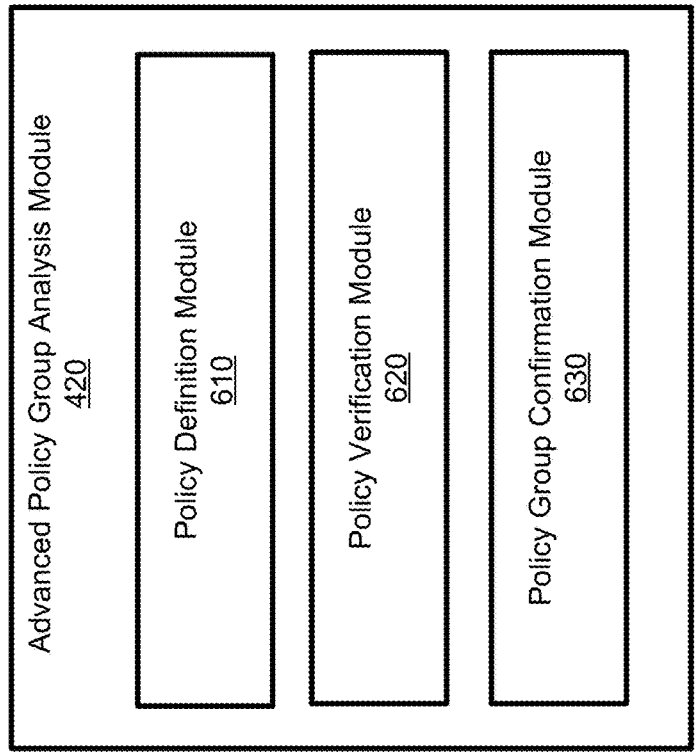
FIG. 6 illustrates an embodiment of an advanced policy group analysis module to define an advanced policy group in the related portion of the one or more contracts and generate a validity of the advanced policy group.

Referring to FIG. 6, the advanced policy group analysis module 420 includes a policy definition module 610, a policy verification module 620 and a policy group confirmation module 630. The advanced policy group analysis module 420 defines policies and performs an analysis on the related contracts identified from the related contracts identification module 410.

The policy definition module 610 allows the user to define an advanced policy group to be confirmed in the related contracts. The advanced policy group includes a plurality of policy groups, where each of the plurality of policy groups includes a plurality of policies. The policy definition module 610 receives a data set including the predefined policy, search indexes, and the initial search results from the discovery engine 120. Furthermore, the policy definition module 610 allows the user to define the policies that include primary rules, primary features, primary clause examples and a threshold value to be applied in a semantic language evaluation. Alternatively, the policy definition module 610 may utilize features and policies prepared from the discovery engine 120. A policy provides guidance on how and where to look for contract specific terminologies. For example, the user may define an advanced policy group that may include policy groups such as 'termination clauses,' 'limitation of liability clauses,' and 'assignment clauses.' Each policy group may include specific clause examples such as '10% penalty,' and 'liability in excess of two million dollars.'

The policy verification module 620 performs an analysis with the policies defined in the policy definition module 610. Specifically, the policy verification module 620 verifies each of the plurality of policy groups to generate, for each policy group, a validity of a policy group under the verification. With the semantic language evaluator 140, the policy verification module 620 determines a validity of a policy group based on whether each policy is valid or not. For example, if a policy includes a clause example 'governing law New York' and any of the related contracts includes a similar or related clause according to the semantic language evaluator 140, then the policy is determined to be valid. In one embodiment, if a policy group includes any valid policy, then the policy verification module 620 assigns a valid state to the policy group. If all polices in the policy group are invalid, then the policy verification module 620 assigns an invalid state to the policy group. Hence, the policy verification module 620 applies an 'OR' logical expression on policies within a policy group to determine a state of the policy group according to one embodiment.

With the user defined primary features, the policy definition module 610 replaces the actual text, phrases or clauses with the primary features to determine whether a policy is valid or not. Analyzing the primary features replaced data set with the semantic language evaluator 140 ensures the accuracy and quality of the data. That is, the semantic language evaluator 140 accounts for minor anomalies within the clauses, allowing the analysis engine 130 to locate and group clauses based on the core semantics. The policy verification module 620 transfers clause examples to the semantic language evaluator 140, and the semantic language evaluator 140 assesses the similarity to each of the examples. In one exemplary art, the semantic language evaluator 140 may be a Latent Symantec Index (LSI) module, which may provide a cosine vector score based on the similarity and classify clauses accordingly. For instance, a cosine vector score of '1' indicates a high degree of similarity, when '0' indicates a low degree of similarity. In one aspect, clauses with cosine vector scores higher than a threshold value are considered similar.

The policy group confirmation module 630 analyzes each of the plurality of policy groups to determine a phase of the advanced policy group. In one embodiment, if each of the plurality of policy groups has a valid state, then the policy group confirmation module 630 assigns a valid phase to the advanced policy group. On the other hand, if at least one policy group has an invalid state, then the policy group confirmation module 630 assigns an invalid phase to the advanced policy group. Hence, the policy group confirmation module 630 applies an 'AND' logical expression on the policy groups to determine a phase of the advanced policy group in one embodiment.

Example Related Contracts Analysis Method

Figure 7:
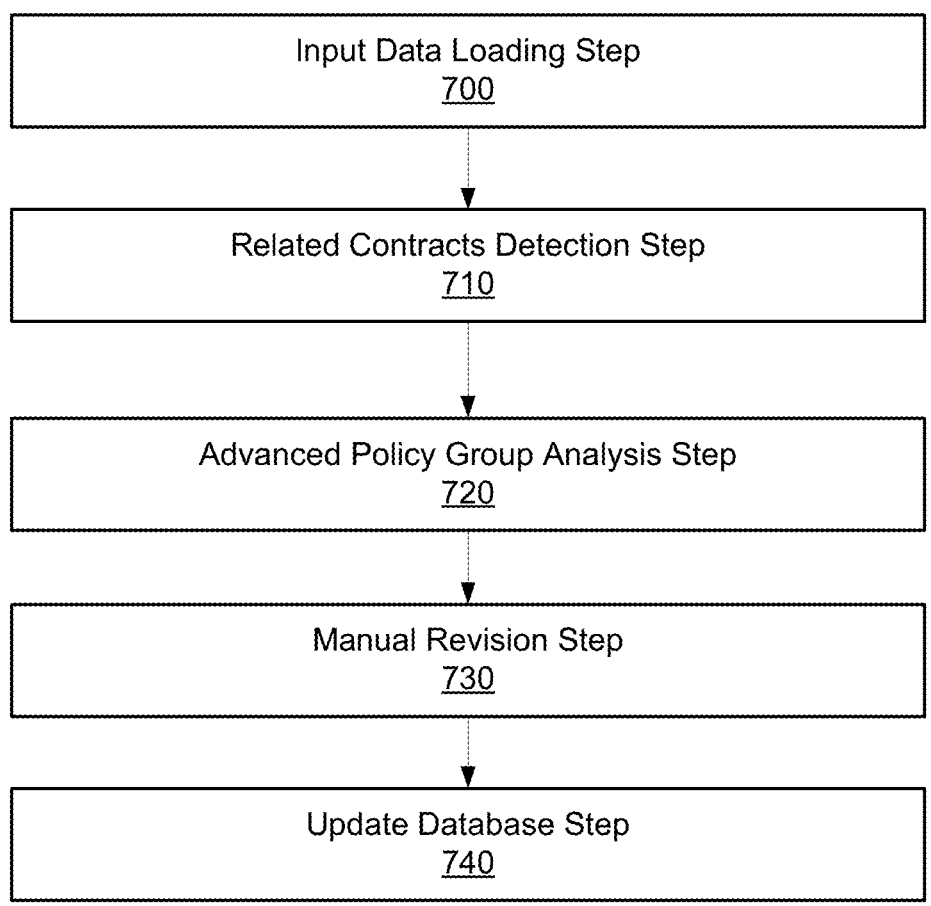
FIG. 7 illustrates a flow chart of an advanced policy group detection process, according to one embodiment.

FIG. 7 illustrates a flow chart for related contracts analysis to analyze contents in related contracts including a primary contract and its derivatives (e.g., amendments or addendums). In one embodiment, the system 100 may implement the disclosed related contracts analysis method. The related contracts analysis includes an input data loading step 700, a related contracts detection step 710, an advanced policy group analysis step 720, a manual revision step 730, and an update database step 740.

In FIG. 7, the related contract analysis system 100 loads a plurality of documents in the input data loading step 700. From the plurality of documents, the system 100 identifies related contracts and sequentially establishes linkages of the related contracts according to the modification time of the document in the related contracts detection step 710. The related contracts may include a primary contract and amendments associated with the primary contract.

In the advanced policy group analysis step 720, the system 100 defines an advanced policy group to perform an analysis on the related contracts. The system 100 automatically determines policy groups to be incorporated in the advanced policy group. Alternatively and additionally, a user determines policy groups to be incorporated in the advanced policy group. In one embodiment, the system 100 verifies each of the plurality of policy groups, and generates, for each policy group, a validity of a policy group under the verification in the advanced policy group analysis step 720. Moreover, the system 100 may generate a validity of the advanced policy group by examining the validity of the policy group for the each policy group in the advanced policy group analysis step 720.

In one embodiment, the system 100 allows a user to view results obtained from the advanced policy group analysis step 720 and manually analyze contents in the related contracts in the manual revision step 730. The system 100 may enable the user to adjust related contracts identified in the related contracts detection step 710 or advanced policy group defined in the advanced policy group analysis step 720. The system 100 may iteratively perform the steps 710, 720, and 730 to achieve desired results. Additionally, the system 100 may allow multiple users to perform the steps 710, 720, and 730 to review items detected.

In the update database step 740, the system 100 stores results from the steps 710, 720 and 730 in the database 150. The results may include the related portion of the one or more contracts and the validity of the advanced policy group.

Figure 8:
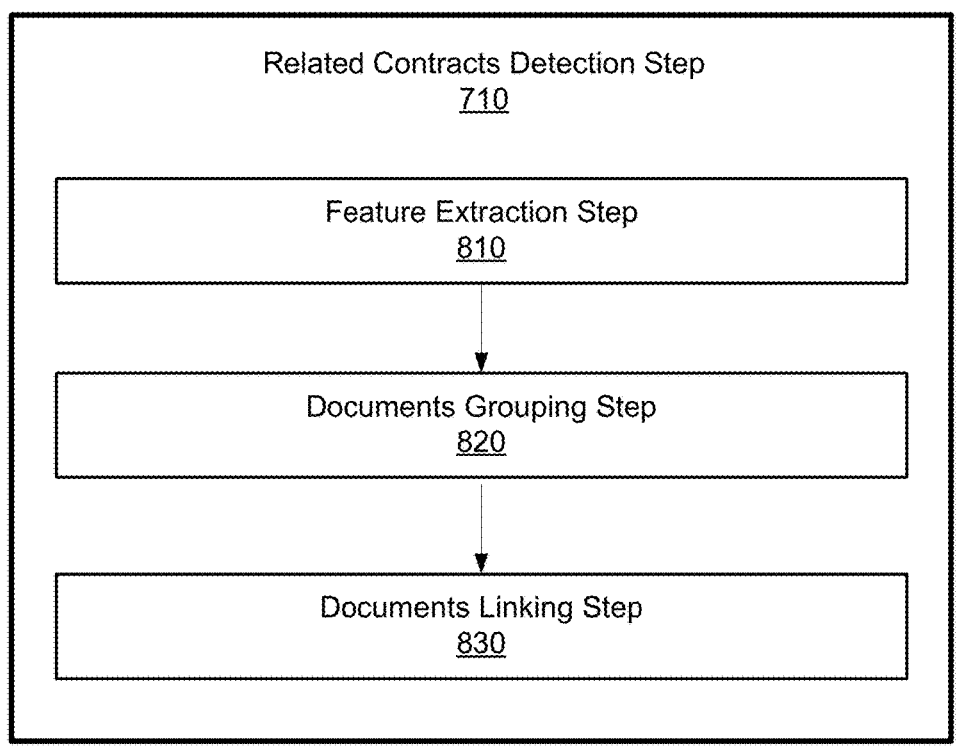
FIG. 8 illustrates a detailed process of a related contracts detection, according to one embodiment.

Referring to FIG. 8, illustrated is a detailed process of the related contracts detection step 710. The related contracts detection step 710 includes a feature extraction step 810, a documents grouping step 820, and a documents linking step 830. In the feature extraction step 810, the system 100 obtains features from the plurality of documents. Based on the obtained features, the system 100 identifies the related contracts in the documents grouping step 820. In addition, the system 100 sorts the primary contract with the amendments in the related documents by the modification time, and further sequentially establishes linkages (e.g. associations) from one contract to another in the documents linking step 830.

Figure 9:
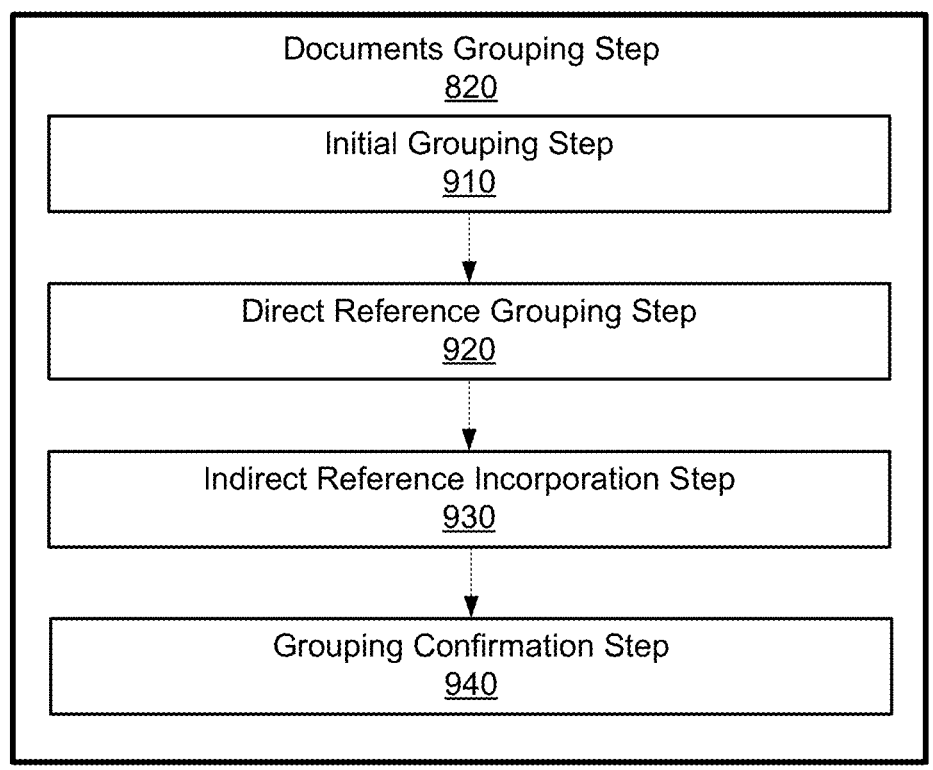
FIG. 9 illustrates a detailed process of documents grouping, according to one embodiment.

Referring to FIG. 9, illustrated is the documents grouping step 820 in detail. The documents grouping step 820 includes an initial grouping step 910, a direct reference grouping step 920, an indirect reference incorporation step 930, and a grouping confirmation step 940. The system 100 builds a feature space matrix with the extracted primary features, and then groups the contracts into a primary group and a secondary group by the contract type and the contract class in the initial grouping step 910. The primary group includes the primary contract, whereas the secondary group includes the amendments.

After the initial grouping step 910, the system 100 further divides the amendments in the secondary group into a related group and a non-related group by comparing the reference dates in the direct reference grouping step 920. Specifically, the system 100 compares each of the reference dates of the amendments in the related group with each of the reference dates of the primary contract, then classifies the amendments into the related group if there is at least one matching reference date in the direct reference grouping step 920. Hence, the system 100 classifies the amendments with direct references to the primary contract in the direct reference grouping step 920. Furthermore, if there are no matching reference dates in an amendment, then the system 100 classifies the amendment into the non-related group in the direct reference grouping step 920.

Moreover, the system 100 finds additional related contracts and includes the related contracts into the related group by comparing the reference dates in the indirect reference incorporation step 930. Specifically, the system 100 compares each of the reference dates of the amendments in the non-related group with each of the reference dates of the amendments in the related group. If there is at least one matching reference date, the system 100 incorporates an amendment in the non-related group with a matching reference date into the related group in the indirect reference incorporation step 930. Hence, the system 100 can incorporate the amendments with indirect references to the primary contract into the related group in the indirect reference incorporation step 930. In case an amendment from the non-related group is incorporated into the related group, the system 100 compares remaining amendments in the non-related group in the indirect reference incorporation step 930, because the recently incorporated amendment may include the reference dates that have not been compared before.

In the grouping confirmation step 940, the system 100 identifies any incorrect grouping from the direct reference grouping step 920 and the indirect reference incorporation step 930 by comparing the modification time. In the grouping confirmation step 940, the system 100 excludes the amendment with the modification time prior to the start date of the primary contract from the related group and incorporates it into the non-related group.

Figure 10:
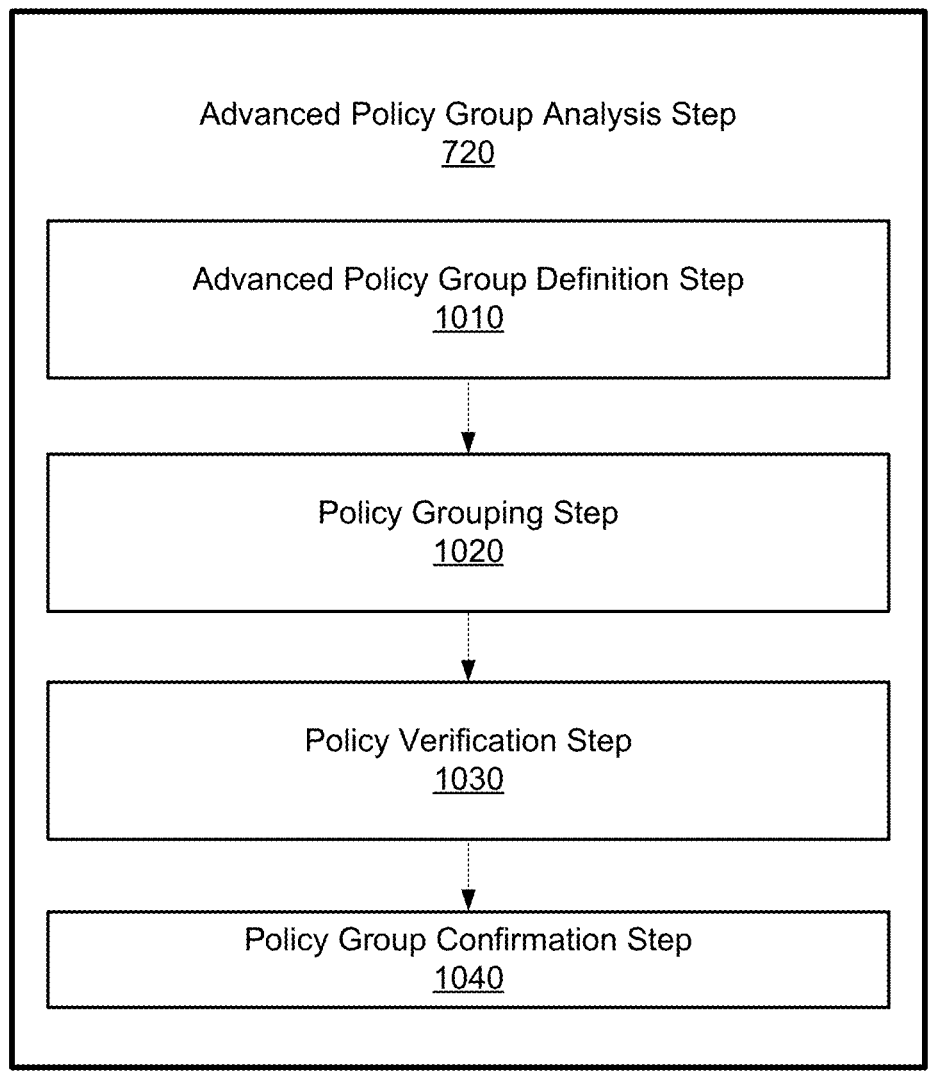
FIG. 10 illustrates a detailed process of advanced policy group analysis, according to one embodiment.

Referring to FIG. 10, illustrated is the advanced policy group analysis step 720 in detail, according to one embodiment. The advanced policy group analysis step 720 includes an advanced policy group definition step 1010, a policy grouping step 1020, a policy verification step 1030, and a policy group confirmation step 1040.

In the advanced policy group definition step 1010, the system 100 defines an advanced policy group to perform an analysis on the related contracts. The advanced policy group includes a plurality of policy groups. In one embodiment, the system 100 may generate the advanced policy group based on a data set generated from the system 100 including the predefined policy, search indexes, and the initial search results in the advanced policy group definition step 1010. Alternatively and additionally, the system 100 may allow the user to define the advanced policy group based on the data set generated from the system 100 in the advanced policy group definition step 1010.

In the policy grouping step 1020, the system 100 may enable a user to define policies and group them into policy groups. A policy includes primary rules, primary features, primary clause examples and a threshold value to be applied in a semantic language evaluation in the policy verification step 1030. A policy provides guidance on how and where to look for contract specific terminologies. In one embodiment, in the policy grouping step 1020, the system 100 may automatically define policies and group them into the policy groups based on the data set generated from the system 100. Alternatively and additionally, in the policy grouping step 1020, the system 100 may allow the user to define the policies and group them into the policy groups based on the data set generated from the system 100.

In one embodiment, the system 100 performs an analysis with the policies defined in the policy verification step 1030. Specifically, the system 100 verifies each of the plurality of policy groups to generate, for each policy group, a validity of a policy group under the verification in the policy verification step 1030. By performing semantic language evaluation, the system 100 determines a validity of a policy group based on whether each policy is valid or not in the policy verification step 1030. In one embodiment, if a policy group includes any valid policy, then the system 100 assigns a valid state to the policy group in the policy verification step 1030. On the other hand, if all polices in the policy group are invalid, then the system 100 assigns an invalid state to the policy group in the policy verification step 1030.

In the policy group confirmation step 1040, the system 100 analyzes each of the plurality of policy groups to determine a phase of the advanced policy group. In one embodiment, if each of the plurality of policy groups has a valid state, then the system 100 determines the advanced policy group has a valid phase in the policy group confirmation step 1040. On the other hand, if at least one policy group has an invalid state, then the system 100 determines the advanced policy group has an invalid phase in the policy group confirmation step 1040. According to the phase of the advanced policy group, contents in the related contracts can be easily identified.

Referring to FIGS. 11A and 11B, illustrated are example applications of the disclosed configuration with two sets of related contracts. In FIG. 11A, an advanced policy group includes policy groups 1, 2A, and 3A. For example, the policy group 1 may relate to 'termination clauses,' and the policy group 2 may relate to 'assignment clauses.' Additionally, the policy group 3 may relate to 'limitation of liability clauses.' The policy group 1 may include policies 1112, and 1114. The policy 1112 may be '30 days' and the policy 1114 may be 'at any time.' In the example, the policy group 2A may include policies 1122 and 1124A. The policy 1122 may be 'assigned in a whole,' and the policy 1124A may be 'assign any rights.' Additionally, the policy 1135A may include a policy 'liability over $2,000,000.' According to the disclosed configuration, an 'OR' logical expression is performed to determine a state of each policy group. In FIG. 11A, all policies are valid (i.e., all clauses or similar variations exist in a first set of related contracts), hence each policy group is assigned a valid state by performing the 'OR' logical operation on policies for each policy group. Furthermore, the advanced policy group 1110A is assigned a valid phase by performing an 'AND' logical operation on a state for each of the policy groups.

In FIG. 11B, the advanced policy group 1100B includes the policy groups 1, 2B, and 3B, which are similar to policy groups 1, 2A, and 3A from FIG. 11A, respectively. The difference in the advanced policy group 1100B is that the policy 1124B and the policy 1135B are invalid (i.e., no similar clause exists in a second set of related contracts.) In this example, invalid policies are marked with cross markings by way of illustration. By performing the 'OR' logical operation, the policy group 2B is placed in a valid state, because the policy 1122 is valid. However, the policy group 3B is placed in an invalid state, because the policy 1135B is invalid and the policy group 3B does not include any valid policy. Furthermore, the advanced policy group 1100B is placed in an invalid phase by performing the 'AND' logical expression on a state for each of the policy groups 1, 2B, and 3B.

As described with respect to FIGS. 11A and 11B, a user is able to determine whether related contracts contain high risk items such as including 'liability over $2,000,000' without perusing through a large volume of document. Beneficially, the disclosed configuration finds the related contracts from corpus amount of data and analyzes contents in the related contracts through an automated process. In FIGS. 11A and 11B, three policy groups and policies are used as a way of example, but in practice, there could be more than hundreds of documents stored in a database, and a user may want to perform complex analysis with more than four policy groups) from the large number of documents. Therefore, without the benefit of the disclosed configuration, time and resources to identify related contractual documents, and to identify critical clauses and variations of them in the identified documents exponentially grow and quickly become impractical to organize and analyze. The disclosed configuration enables a user to review documents in a manageable size and quickly identify critical information in the related contracts through the automated process.

Computing Machine Architecture

Figure 12:
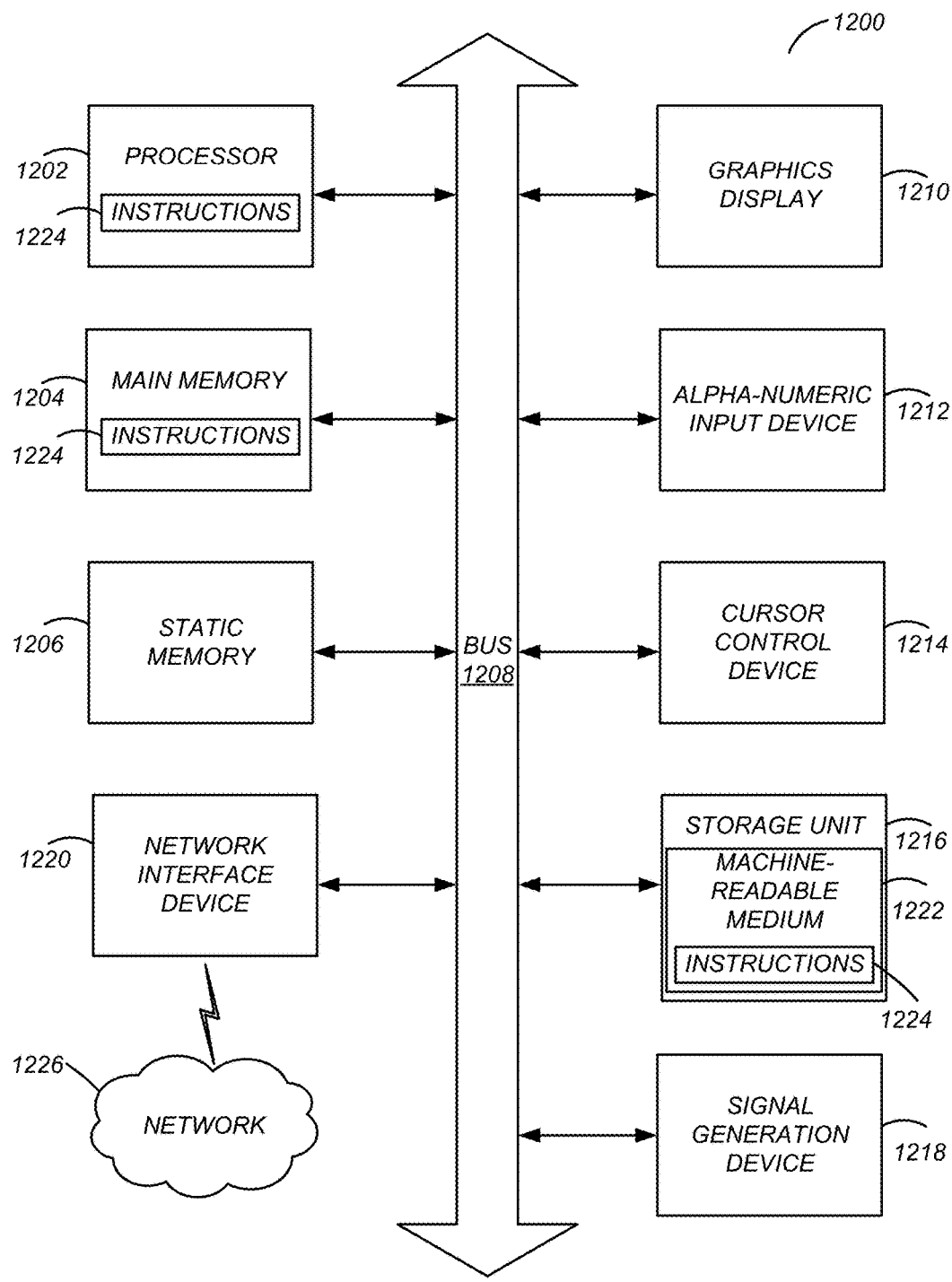
FIG. 12 illustrates one embodiment of components of an example machine able to read instructions from a machine-readable medium and execute them in a processor (or controller).

Turning now to FIG. 12, it is a block diagram illustrating components of an example machine able to read instructions from a machine-readable medium and execute them in a processor (or controller). Specifically, FIG. 12 shows a diagrammatic representation of a machine in the example form of a computer system 1200 within which instructions 1224 (e.g., software or program code) for causing the machine to perform (execute) any one or more of the methodologies described with FIGS. 1-11. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The processing components are the processor 1202 and memory 1204. These components can be configured to operate the engines or modules with the instructions that correspond with the functionality of the respective engines or modules. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software or program code) embodying any one or more of the methodologies or functions described herein. The instructions 1224 (e.g., software or program code) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

It is noted that although the configurations as disclosed are in the context of contracts, the principles disclosed can apply to analysis of other documents that can include data corresponding to specific terminologies or clauses related to another document. Advantages of the disclosed configurations include promptly identifying semantically related terminologies and extracting unusual variations of the semantically related terminologies in a large volume of related documents. Moreover, while the examples herein were in the context of contracts, the principles described herein can apply to other documents, including web pages, having specific terminologies or clauses.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-11. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1202, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an advanced policy grouping detection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method of analyzing contents in one or more contracts, the method comprising:
   obtaining primary features from the one or more contracts;
   grouping, by the primary features, a related portion of the one or more contracts;
   ordering and linking, by the primary features, the related portion of the one or more contracts by updating a features database to store the obtained primary features, and building a feature space matrix comprising pointers to the primary features in the features database, each pointer identifying a corresponding portion of the related portion of the one or more contracts;
   defining an advanced policy group comprising a plurality of policy groups, the plurality of policy groups grouping a plurality of policies, the plurality of policies comprising clause examples to compare against clauses in the related portion of the one or more contracts;
   verifying each of the plurality of policy groups to generate, for each policy group, a validity of the policy group, wherein the validity of the policy group has a state comprised of one of:
      a valid state indicating the policy group comprises at least one policy with a related clause from the related portion of the one or more contracts, and
      an invalid state indicating the policy group comprises policies without any related clause from the related portion of the one or more contracts;
   generating a validity of the advanced policy group by examining the validities of each of the plurality of policy groups;
   analyzing the contents in the related portion of the one or more contracts based on the validity of the advanced policy group; and
   updating a database using the related portion of the one or more contracts and the generated validity of the advanced policy group.

2. The method of claim 1, wherein verifying the each of the plurality of policy groups to generate, for the each policy group, the validity of the policy group comprises comparing policies grouped in the policy group against the clauses in the related portion of the one or more contracts by a semantic language evaluator.

3. The method of claim 1, wherein the validity of the advanced policy group has a phase comprised of one of:
   a valid phase indicating the each of the plurality of policy groups having the valid state, and
   an invalid phase indicating at least one policy group from the plurality of policy groups having the invalid state.

4. The method of claim 1, wherein the advanced policy group comprises more than four policy groups, and wherein verifying each of the plurality of policy groups and generating the validity of the advanced policy group are automatically performed by one or more processors.

5. A computer implemented method of analyzing contents in one or more contracts, the method comprising:
   identifying a related portion of one or more contracts by:
      extracting primary features from the one or more contracts, and
      ordering and linking, by the primary features, the related portion of the one or more contracts by updating a features database to store the obtained primary features, and building a feature space matrix comprising pointers to the primary features in the features database, each pointer identifying a corresponding portion of the related portion of the one or more contracts;
   defining an advanced policy group comprising a plurality of policy groups, the plurality of policy groups grouping a plurality of policies, the plurality of policies comprising clause examples to compare against clauses in the related portion of the one or more contracts;
   assigning a validity state for each of the plurality of policy groups, wherein the validity state of a policy group of the plurality of policy groups corresponds to one of:
      a valid state indicating the policy group comprises at least one policy with a related clause from the related portion of the one or more contracts, and
      an invalid state indicating the policy group comprises policies without any related clause from the related portion of the one or more contracts;
   generating a validity of the advanced policy group based upon the validity state of each of the plurality of policy groups;
   updating a database using the related portion of the one or more contracts and the generated validity of the advanced policy group based upon an analysis of the contents in the related portion of the one or more contracts based on the validity of the advanced policy group.

6. The method of claim 5, wherein verifying the each of the plurality of policy groups to generate, for the each policy group, the validity of the policy group comprises comparing policies grouped in the policy group against the clauses in the related portion of the one or more contracts by a semantic language evaluator.

7. The method of claim 5, wherein the validity of the advanced policy group has a phase comprised of one of:
   a valid phase indicating the each of the plurality of policy groups having the valid state, and
   an invalid phase indicating at least one policy group from the plurality of policy groups having the invalid state.

8. The method of claim 5, wherein the advanced policy group comprises more than four policy groups, and wherein verifying each of the plurality of policy groups and generating the validity of the advanced policy group are automatically performed by one or more processors.

9. A system for analyzing contents in one or more contracts, the system comprising:
   a processor;
   a non-transitory computer-readable storage medium storing executable computer program instructions, the instructions, when executed by the processor, cause the processor to:
      via an analysis engine, obtain primary features from the one or more contracts,
      order and link a related portion of the one or more contracts based on the primary features by updating a features database to store the obtained primary features, and building a feature space matrix comprising pointers to the primary features in the features database, each pointer identifying a corresponding portion of the related portion of the one or more contracts,
      define an advanced policy group comprising a plurality of policy groups, the plurality of policy groups grouping a plurality of policies, the plurality of policies comprising clause examples to compare against clauses in the related portion of the one or more contracts, verify each of the plurality of policy groups to generate, for each policy group, a validity of the policy group, wherein the validity of the policy group has a state comprised of one of:
  a valid state indicating the policy group comprises at least one policy with a related clause from the related portion of the one or more contracts, and
  an invalid state indicating the policy group comprises policies without any related clause from the related portion of the one or more contracts;

generate a validity of the advanced policy group based upon the validity of each of the plurality of policy groups, and analyze the contents in the related portion of the one or more contracts based on the validity of the advanced policy group; and a database configured to store the contents in the related portion of the one or more contracts and the generated validity of the advanced policy group.

10. The system for claim 9, wherein the instructions, when executed by the processor, further cause the processor to, via an input processor engine, retrieve the one or more contracts into a format that a discovery engine can process.

11. The system for claim 9, wherein the instructions, when executed by the processor, further cause the processor to, via a discovery engine, generate predefined features to display for an user.

12. The system for claim 9, wherein the instructions, when executed by the processor, further cause the processor to, via the analysis engine:
  define the primary features,
  obtain the primary features in the one or more contracts,
  group the related portion of the one or more contracts by the primary features,
  order and couple the related portion of the one or more contracts by the primary features, and
  display the related portion of the one or more contracts in order.

13. The system for claim 9, wherein the instructions, when executed by the processor, further cause the processor to:
  via a semantic language evaluator, compare policies grouped in the policy group against the clauses in the related portion of the one or more contracts.

14. A non-transitory computer readable storage medium configured to store program code, the program code configured to analyze contents in one or more contracts, the program code comprising instructions that when executed by a processor cause the processor to:
  identify a related portion of one or more contracts by:
    extracting primary features from the one or more contracts, and
    ordering and linking, by the primary features, the related portion of the one or more contracts by updating a features database to store the obtained primary features, and building a feature space matrix comprising pointers to the primary features in the features database, each pointer identifying a corresponding portion of the related portion of the one or more contracts;
  define an advanced policy group comprising a plurality of policy groups, the plurality of policy groups grouping a plurality of policies, the plurality of policies comprising clause examples to compare against clauses in the related portion of the one or more contracts,
  assign a validity state for each of the plurality of policy groups, wherein the validity state of a policy group of the plurality of policy groups corresponds to one of:
    a valid state indicating the policy group comprises at least one policy with a related clause from the related portion of the one or more contracts, and
    an invalid state indicating the policy group comprises policies without any related clause from the related portion of the one or more contracts;
  generate a validity of the advanced policy group based upon the validity state of each of the plurality of policy groups;
  updating a database using the related portion of the one or more contracts and the generated validity of the advanced policy group based upon an analysis of the contents in the related portion of the one or more contracts based on the validity of the advanced policy group.

15. The non-transitory computer readable storage medium of claim 14, wherein the instructions to verify the each of the plurality of policy groups to generate, for the each policy group, the validity of the policy group further comprise instructions that when executed by the processor cause the process to:
  compare policies, grouped in the policy group, against the clauses in the related portion of the one or more contracts by a semantic language evaluator.

16. The non-transitory computer readable storage medium of claim 14, wherein the validity of the advanced policy group has a phase comprised of one of:
  a valid phase indicating the each of the plurality of policy groups having the valid state, and
  an invalid phase indicating at least one policy group from the plurality of policy groups having the invalid state.

17. The non-transitory computer readable storage medium of claim 14, wherein the advanced policy group comprises more than four policy groups, and wherein verifying each of the plurality of policy groups and generating the validity of the advanced policy group are automatically performed by one or more processors.

18. The non-transitory computer readable storage medium of claim 14, further comprising instructions that when executed by the processor cause the processor to:
  define the primary features,
  obtain the primary features in the one or more contracts,
  group the related portion of the one or more contracts by the primary features,
  order and couple the related portion of the one or more contracts by the primary features, and
  display the related portion of the one or more contracts in order.

19. The non-transitory computer readable storage medium of claim 14, further comprising instructions that when executed by the processor cause the processor to, via an input processor engine, retrieve the one or more contracts into a format that a discovery engine can process.

20. The non-transitory computer readable storage medium of claim 14, further comprising instructions that when executed by the processor cause the processor to:
  via a semantic language evaluator, compare policies grouped in the policy group against the clauses in the related portion of the one or more contracts.

* * * * *

UNITED STATES PATENT AND TRADEMARK OFFICE
CERTIFICATE OF CORRECTION

PATENT NO. : 9,996,528 B2  
APPLICATION NO. : 14/340101  
DATED : June 12, 2018  
INVENTOR(S) : Kevin Gidney Page 1 of 1

It is certified that error appears in the above-identified patent and that said Letters Patent is hereby corrected as shown below:

On the Title Page

Item (57) Abstract, Line 12, "based on advanced policy group", insert --an-- to read as --based on an advanced policy group--.

In the Claims

Column 18, Claim 15, Lines 26-27, please replace "the processor cause the process to" with --the processor cause the processor to--.

Signed and Sealed this  
Twenty-second Day of October, 2019

Andrei Iancu  
*Director of the United States Patent and Trademark Office*